(12) United States Patent
Yatsu et al.

(10) Patent No.: US 9,952,714 B2
(45) Date of Patent: Apr. 24, 2018

(54) TOUCH PANEL DEVICE

(71) Applicant: FUJITSU COMPONENT LIMITED, Tokyo (JP)

(72) Inventors: Nobuo Yatsu, Tokyo (JP); Masahiro Kaneko, Tokyo (JP); Yayoi Tokuhara, Tokyo (JP); Kohei Takahashi, Tokyo (JP); Katsuaki Koshimura, Tokyo (JP); Chuqi Liang, Tokyo (JP); Miki Kitahara, Tokyo (JP); Kiwa Imai, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 54 days.

(21) Appl. No.: 15/131,458

(22) Filed: Apr. 18, 2016

(65) Prior Publication Data

US 2017/0090648 A1    Mar. 30, 2017

(30) Foreign Application Priority Data

Sep. 25, 2015    (JP) ................................. 2015-188815

(51) Int. Cl.
| | |
|---|---|
| *G06F 3/041* | (2006.01) |
| *G06F 1/32* | (2006.01) |
| *G06F 3/044* | (2006.01) |
| *G06F 3/045* | (2006.01) |
| *G06F 3/047* | (2006.01) |

(52) U.S. Cl.
CPC .......... *G06F 3/0416* (2013.01); *G06F 1/3231* (2013.01); *G06F 1/3262* (2013.01); *G06F 3/044* (2013.01); *G06F 3/045* (2013.01); *G06F 3/047* (2013.01); *G06F 2203/04106* (2013.01)

(58) Field of Classification Search
CPC .. G02F 1/13338; G06F 3/0412; G06F 3/0414; G06F 2203/04106; G06F 3/044; G06F 3/045
See application file for complete search history.

(56) References Cited

U.S. PATENT DOCUMENTS

| 6,375,306 B1 | 4/2002 | Tsukagoshi |
| 2006/0232559 A1 | 10/2006 | Chien et al. |

(Continued)

FOREIGN PATENT DOCUMENTS

| CN | 101872265 B | 4/2015 |
| EP | 2 405 327 A1 | 1/2012 |

(Continued)

OTHER PUBLICATIONS

Extended European Search Report dated Jan. 27, 2017 in corresponding European Patent Application No. 16170784.9.

(Continued)

*Primary Examiner* — Insa Sadio
(74) *Attorney, Agent, or Firm* — Staas & Halsey LLP

(57) ABSTRACT

A touch panel device including: a first substrate having a plurality of first patterns which are electrically separated from each other; a second substrate having a plurality of second patterns which are arranged opposite to the first patterns and electrically separated from each other; and a controller that is in a pause state until one of the first patterns contacts one of the second patterns, and begins detection of an input position when one of the first patterns contacts one of the second patterns.

6 Claims, 8 Drawing Sheets

(56) References Cited

U.S. PATENT DOCUMENTS

| | | |
|---|---|---|
| 2010/0182270 A1 | 7/2010 | Caliskan et al. |
| 2010/0231530 A1 | 9/2010 | Lin et al. |
| 2010/0271322 A1 | 10/2010 | Kondoh et al. |
| 2011/0248728 A1 | 10/2011 | Maruyama |
| 2012/0086667 A1 | 4/2012 | Coni et al. |
| 2012/0086668 A1* | 4/2012 | Wang ............ G06F 3/044 345/174 |
| 2012/0262416 A1 | 10/2012 | Kitamura |
| 2013/0021295 A1 | 1/2013 | Kimura et al. |
| 2014/0152921 A1 | 6/2014 | Yashiro et al. |
| 2016/0139713 A1 | 5/2016 | Kondoh et al. |

FOREIGN PATENT DOCUMENTS

| | | |
|---|---|---|
| JP | 2000-71520 | 3/2000 |
| JP | 2011-221677 | 11/2011 |
| JP | 2012-519337 | 8/2012 |
| KR | 10-2013-0049692 | 5/2013 |
| TW | 201314528 A1 | 4/2013 |
| WO | WO 2011/122346 A1 | 10/2011 |

OTHER PUBLICATIONS

Japanese Platform for Patent Information, Publication No. 2011-221677, published Nov. 4, 2011.
Espacenet English abstract, Publication No. 201314528 published Apr. 1, 2013.
Espacenet English abstract, Publication No. 10-2013-004962 published May 14, 2013.
J-Plat Pat English abstract, Publication No. 2000-71520 published Mar. 7, 2000.
PSS System English abstract, Publication No. 101872265 published Apr. 1, 2015.
Taiwanese Office Action dated Oct. 26, 2016 in corresponding Taiwanese Patent Application No. 105112315.

* cited by examiner

SA: SIGNAL APPLICATION
SD: SIGNAL DETECTION

SA: SIGNAL APPLICATION
SD: SIGNAL DETECTION

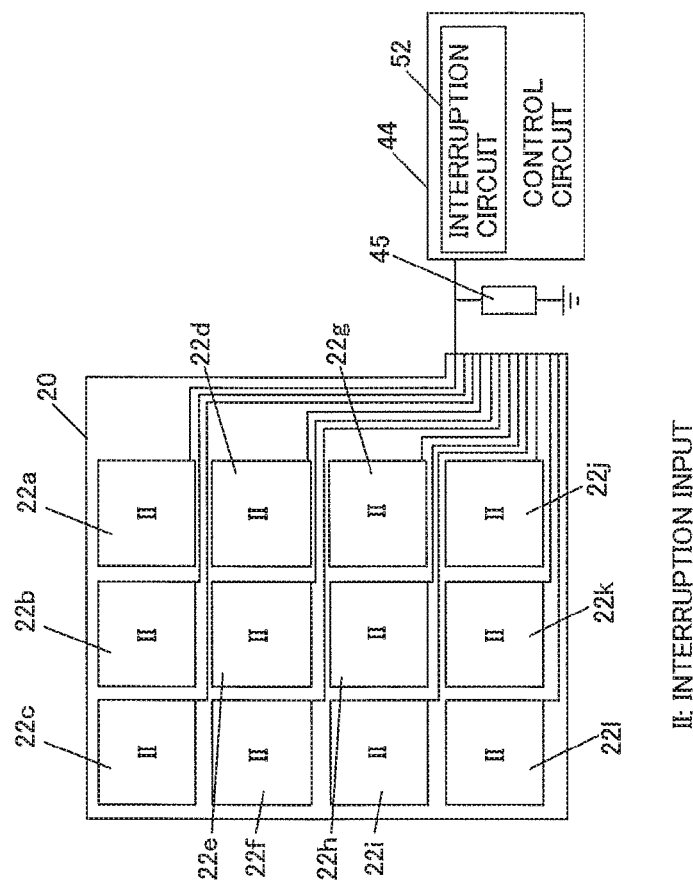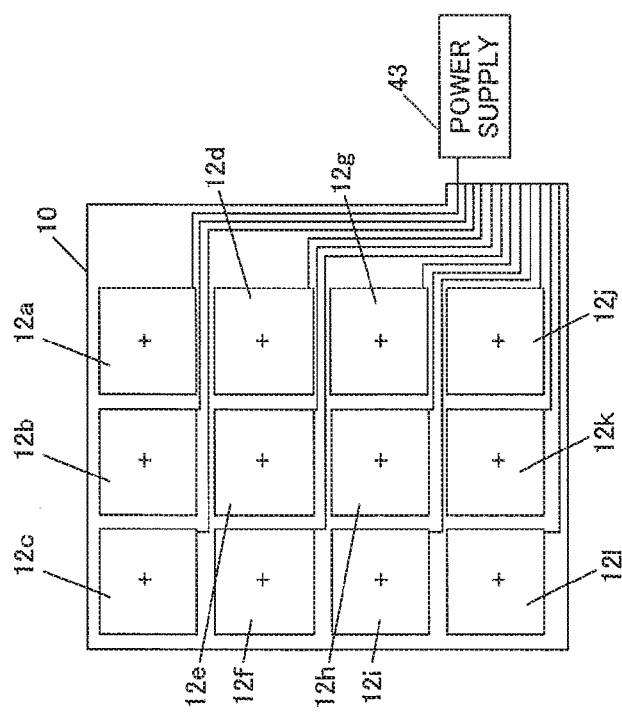
FIG. 5A
FIG. 5B 12 (22)

12 (22)

TOUCH PANEL DEVICE

CROSS-REFERENCE TO RELATED APPLICATION

This application is based upon and claims the benefit of priority of the prior Japanese Patent Application No. 2015-188815 filed on Sep. 25, 2015, the entire contents of which are incorporated herein by reference.

FIELD

A certain aspect of the embodiments is related to a touch panel device.

BACKGROUND

Conventionally, there has been known a display device which includes a pressure sensor for detecting a press of an input surface and an electrostatic capacitance type touch panel for detecting a contact position on the input surface (e.g. see International Publication No. WO2011/122346).

There is an electrostatic capacitance type touch panel in which a plurality of patterns are formed on the touch panel, a signal is applied to one of the patterns in order to detect a finger on the touch panel, and a detection circuit detects another signal from another pattern around the pattern to which the signal is applied. In such a touch panel, the pattern to which the signal is applied and the another pattern for detecting the another signal need to be sequentially changed to other patterns, respectively (i.e., they need to be sequentially scanned).

SUMMARY

According to an aspect of the present invention, there is provided a touch panel device including: a first substrate having a plurality of first patterns which are electrically separated from each other; a second substrate having a plurality of second patterns which are arranged opposite to the first patterns and electrically separated from each other; and a controller that is in a pause state until one of the first patterns contacts one of the second patterns, and begins detection of an input position when one of the first patterns contacts one of the second patterns.

The objects and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A and 5B are diagrams explaining a process of a control circuit when the touch panel is shifted to a pause state;

DESCRIPTION OF EMBODIMENTS

In the above-mentioned conventional electrostatic capacitance type touch panel, since the pattern to which the signal is applied and the another pattern for detecting the another signal need to be sequentially scanned, a control circuit always needs to execute a program for switching their patterns to other patterns, and hence the touch panel has large power consumption.

In the technique of International Publication No. WO2011/122346, a pressure sensor needs to be arranged under a sealing member provided inside the electrostatic capacitance type touch panel and on the outer periphery of the electrostatic capacitance type touch panel, and hence it is not possible to reduce the thickness of the touch panel.

A description will now be given of an embodiments of the present invention with reference to the drawings.

Figure 1:
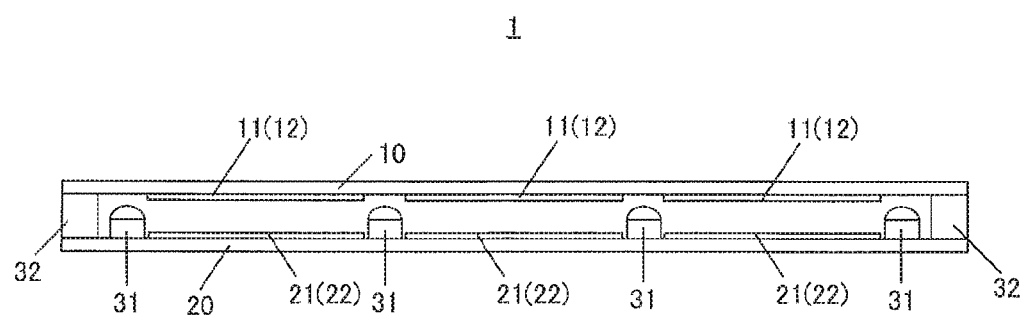
FIG. 1 is a cross-section diagram illustrating a touch panel included in a touch panel device according to a present embodiment.
Figure 2:
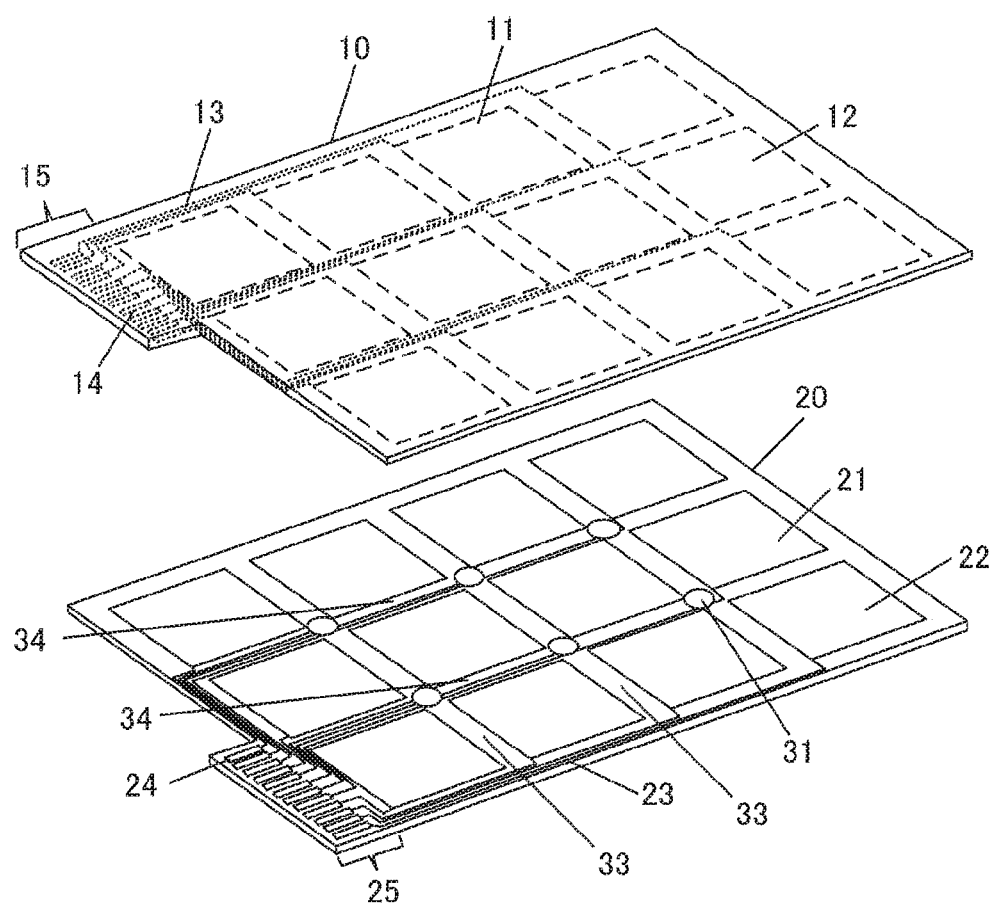
FIG. 2 is a perspective view illustrating the touch panel included in the touch panel device according to the present embodiment.

FIG. 1 is a cross-section diagram illustrating a touch panel included in a touch panel device according to a present embodiment. FIG. 2 is a perspective view illustrating the touch panel included in the touch panel device according to the present embodiment. In the following description, a "touch panel" indicates panel structure in which substrates as panels are combined and a conductive film is formed on each of the substrates. The "touch panel device" indicates a device including the "touch panel", a control circuit executing a process such as position detection, and so on.

As illustrated in FIG. 1, a touch panel 1 includes a first substrate 10 having flexibility, and a second substrate 20. The first substrate 10 is made of PET (Polyethylene Terephthalate), and the second substrate 20 is made of glass, for example. A first conductive film 11 made of ITO (Indium Tin Oxide) is provided on a lower surface of the first substrate 10. A second conductive film 21 made of ITO (Indium Tin Oxide) is provided on an upper surface of the second substrate 20. The first conductive film 11 includes a plurality of patterns 12 which are electrically separated from each other, and the second conductive film 21 includes a plurality of patterns 22 which are electrically separated from each other. In an example of FIG. 2, each of the shapes of the patterns 12 and 22 is a square, but is not limited to this. In FIG. 1, a size (i.e. an area) of each pattern 12 is the same as that of each pattern 22. When the touch panel 1 is viewed from above, the position of the pattern 12 is the same as that of the pattern 22 opposite to the pattern 12.

Spacers 31 and supporters 32 made of an insulator are provided on the upper surface of the second substrate 20. The supporters 32 are fixed between the first substrate 10 and the second substrate 20, and arranged on the periphery of the first substrate 10 and the second substrate 20.

The spacers 31 are arranged on positions opposite to positions where the patterns 12 of the first substrate 10 (i.e., the first conductive film 11) are not provided. When the first substrate 10 is not depressed, the second substrate 20 is away from the first substrate 10 via the spacers 31. When the first substrate 10 is depressed, the first substrate 10 is bent, and the pattern 12 contacts the pattern 22 (i.e., the second conductive film 21). As illustrated in FIG. 2, each of the spacers 31 is formed on an intersection point of an area 33 between the patterns 22 adjacent to each other in an X-direction and an area 34 between the patterns 22 adjacent to each other in a Y-direction.

As illustrated in FIG. 2, a first external connection portion 15 for connecting the first substrate 10 to an external circuit is provided on one end of the first substrate 10. A plurality of first electrodes 14 are formed on the first external connection portion 15, and connected to the patterns 12 via a plurality of lead wires 13, respectively. Moreover, the first electrodes 14 are connected to switching circuits described later, respectively.

A second external connection portion 25 for connecting the second substrate 20 to an external circuit is provided on one end of the second substrate 20. A plurality of second electrodes 24 are formed on the second external connection portion 25, and connected to the patterns 22 via a plurality of lead wires 23, respectively. Moreover, the second electrodes 24 are connected to switching circuits described later, respectively.

Figure 3:
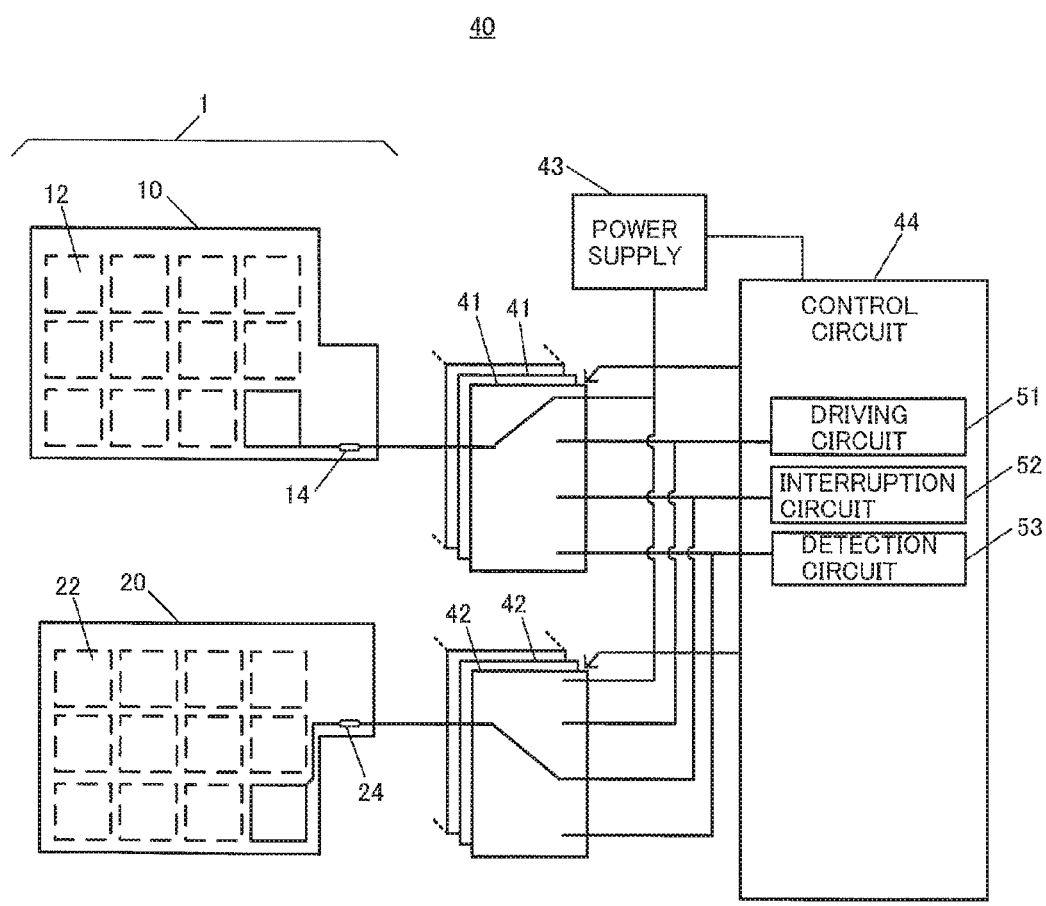
FIG. 3 is a diagram illustrating the configuration of the touch panel device according to the present embodiment.

FIG. 3 is a diagram illustrating the configuration of the touch panel device according to the present embodiment. A touch panel device 40 includes a touch panel 1, switching circuits 41 as an example of a first switch, switching circuits 42 as an example of a second switch, a power supply 43 and a control circuit 44 as an example of a controller. The control circuit 44 controls the operation of the switching circuits 41 and 42, and includes a driving circuit 51, an interruption circuit 52 as an example of an interrupter, and a detection circuit 53 as an example of a detector.

The switching circuits 41 are connected to the patterns 12 of the first substrate 10 via the first electrodes 14, respectively. Each switching circuit 41 switches each first electrode 14 of the first substrate 10, i.e., the connection destination of each pattern 12 to any one of the power supply 43, the driving circuit 51, the interruption circuit 52 and the detection circuit 53. Moreover, the switching circuits 42 are connected to the patterns 22 of the second substrate 20 via the second electrodes 24, respectively. Each switching circuit 42 switches each second electrode 24 of the second substrate 20, i.e., the connection destination of each pattern 22 to any one of the power supply 43, the driving circuit 51, the interruption circuit 52 and the detection circuit 53.

The power supply 43 supplies a voltage to the control circuit 44. Moreover, the power supply 43 applies a voltage to the pattern 12 via the switching circuit 41, or applies a voltage to the pattern 22 via the switching circuit 42. The voltage is used for the input of an interruption signal by the contact of the patterns 12 and 22. When the switching circuit 41 connects the power supply 43 to the pattern 12, the switching circuit 42 connects the interruption circuit 52 to the pattern 22. Thereby, when the pattern 12 contacts the pattern 22, the interruption signal (e.g. the voltage from the power supply 43) is input to the interruption circuit 52.

The driving circuit 51 outputs a pulse signal for detection of the input position to the pattern 12. Similarly, the driving circuit 51 outputs the pulse signal for detection of the input position to the pattern 22.

The detection circuit 53 detects a signal level (specifically, a voltage value) applied to another pattern 12 adjacent to the pattern 12 to which the pulse signal for detection of the input position is input. Similarly, the detection circuit 53 detects the signal level applied to another pattern 22 adjacent to the pattern 22 to which the pulse signal for detection of the input position is input.

Due to the input of the pulse signal, an electric field is generated between the pattern 12 connected to the driving circuit 51 and another adjacent pattern 12. When a finger of the user is not close to the pattern 12 which is connected to the driving circuit 51 and to which the pulse signal is input, the generated electric field is not affected by the finger, and hence the signal level detected with the detection circuit 53 does not decrease. On the other hand, when the finger of the user comes close to the pattern 12 which is connected to the driving circuit 51 and to which the pulse signal is input, another electric field is generated between the finger of the user and the pattern 12 connected to the driving circuit 51, and hence the electric field generated between the pattern 12 connected to the driving circuit 51 and the another adjacent pattern 12 decreases. Since the signal level detected with the detection circuit 53 decreases due to the decrease of the electric field, the detection circuit 53 can detect the input position. Similarly, the detection circuit 53 can detect the input position due to the decrease of the electric field generated between the pattern 22 connected to the driving circuit 51 and another adjacent pattern 22.

The interruption circuit 52 detects the interruption signal. Specifically, when the pattern 22 to which the switching circuit 42 connects the power supply 43 contacts the pattern 12 to which the switching circuit 41 connects the interruption circuit 52, the interruption circuit 52 detects a current which flows between the patterns 22 and 12, as the interruption signal. Moreover, when the pattern 12 to which the switching circuit 41 connects the power supply 43 contacts the pattern 22 to which the switching circuit 42 connects the interruption circuit 52, the interruption circuit 52 detects the interruption signal.

Figure 4A:
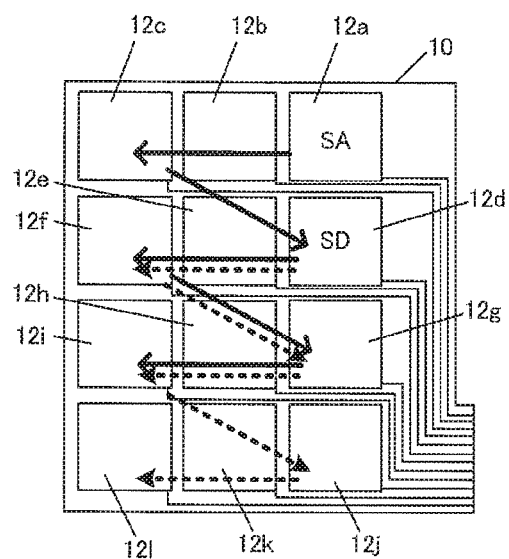
FIGS. 4A and 4B are diagrams illustrating an arrangement relationship of patterns to which a pulse signal is applied and another patterns for signal level detection adjacent to the patterns.
Figure 4B:
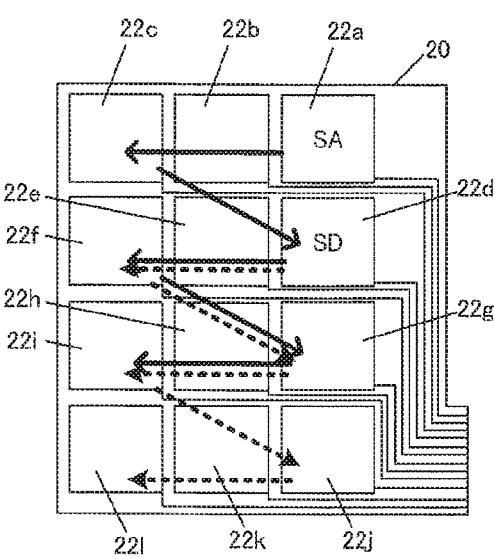

FIGS. 4A and 4B are diagrams illustrating an arrangement relationship of patterns to which the pulse signal is applied and another patterns for signal level detection adjacent to the patterns. In FIGS. 4A and 4B, an arrow of a solid line indicates a transition state of the patterns to which the pulse signal is applied, and an arrow of a dotted line indicates a transition state of the patterns for detecting a signal.

The first substrate 10 includes a plurality of patterns 12a to 12l. The second substrate 20 includes a plurality of patterns 22a to 22l. The patterns 12a to 12l and the patterns 22a to 22l have the same shape and the same size (i.e., the same area). Then, when the first substrate 10 is arranged on the second substrate 20, the patterns 12a to 12l are arranged on the patterns 22a to 22l, i.e., the patterns 12a to 12l are opposed to the patterns 22a to 22l via an air gap, respectively.

Moreover, the patterns arranged vertically opposite to each other, i.e., the patterns 12 and 22 arranged on the same position in a horizontal plane (i.e., an X-Y plane) are connected to the driving circuit 51 or the detection circuit 53 via the switching circuits 41 and 42. For example, the patterns 12a and the patterns 22a are connected to the driving circuit 51, and the pattern 12d adjacent to the pattern 12a and the pattern 22d adjacent to the pattern 22a are connected to the detection circuit 53.

When the input position is detected, the patterns 12a and 22a are first connected to the driving circuit 51 via the switching circuits 41 and 42, and the same pulse signal is applied to the patterns 12a and 22a. At this time, the patterns 12d and 22d adjacent to the respective patterns 12a and 22a are connected to the detection circuit 53 via the switching circuits 41 and 42. When a process for the signal detection using the patterns 12d and 22d is completed, the patterns 12a and 22a are disconnected from the driving circuit 51, the patterns 12b and 22b adjacent to the respective patterns 12a and 22a are connected to the driving circuit 51 via the switching circuits 41 and 42, and the same pulse signal is applied to the patterns 12b and 22b. Moreover, the patterns 12d and 22d are disconnected from the detection circuit 53, the patterns 12e and 22e are connected to the detection circuit 53, and a signal detection process is performed from the patterns 12e and 22e.

Thus, the patterns to which the pulse signal is applied and the patterns for detecting the signal are sequentially changed so as to be shifted one by one. The timing for changing the patterns to which the pulse signal is applied is the same as the timing for changing the patterns for detecting the signal.

When the application of the pulse signal to the patterns 12c and 22c in first steps of FIGS. 4A and 4B and the signal detection process of the patterns 12f and 22f in second steps of FIGS. 4A and 4B are completed, the patterns to which the pulse signal is applied and the patterns for detecting the signal are shifted by one steps, respectively, and the pulse signal to the patterns 12d and 22d in the second steps of FIGS. 4A and 4B and the signal detection process of the patterns 12g and 22g in third steps of FIGS. 4A and 4B is begun.

The control circuit 44 stores information on the signal level detected by the detection circuit 53 into a memory, not shown, beforehand when the finger of the user is not close to the patterns 12 and 22. The control circuit 44 can detect an input position by comparing a signal level actually detected by the detection circuit 53 with the information on the signal level stored into the memory.

Since the same pulse signal is applied to the patterns (e.g. the patterns 12a and 22a) of the first and the second substrates opposite to each other, even if the pattern 12a contacts the pattern 22a by the depression of the user, the signals detected from the adjacent patterns 12d and 22d are not affected. This is because top and bottom patterns have the same electric potential, the change of the electric potential does not occur even if the top and bottom patterns contact each other, and hence the signal detection by the adjacent pattern is not affected.

FIGS. 5A and 5B are diagrams explaining a process of the control circuit when the touch panel is shifted to a pause state.

When the operation of the touch panel 1 is not performed for a certain period of time, the control circuit 44 switches the switching circuits 41 so as to connect all the patterns 12a to 12l of the first substrate 10 to the power supply 43, and switches the switching circuits 42 so as to connect the patterns 22a to 22l of the second substrate 20 to the interruption circuit 52. At this time, the touch panel 1 can work on the same principle as a resistance film type touch panel, and the control circuit 44 transits to the pause state to suppress-own power consumption.

In FIG. 5A, marks "+" indicate that the patterns 12a to 12l are connected to the power supply 43. In FIG. 5B, marks "II (Interruption Input)" indicate that the patterns 22a to 22l are connected to the interruption circuit 52. The patterns 22a to 22l are connected to a ground (0V) via a resistance 45. At this time, the control circuit 44 does not need to scan the patterns to which the pulse signal is applied and the patterns for detecting the signal, so that the control circuit 44 hardly consumes an electric power.

In this state, when the first substrate 10 is depressed, at least one of the patterns 12a to 12l contacts a corresponding one of the opposite patterns 22a to 22l, a voltage of the power supply 43 applied to the patterns 12a to 12l is input to the interruption circuit 52 as an interruption signal. When the interruption signal is input, the control circuit 44 returns to a position detection state for detecting the input position from the pause state. At this time, the control circuit 44 switches the switching circuits 41 and 42 so as to connect the patterns 12a and 22a to the driving circuit 51, and switches the switching circuits 41 and 42 so as to connect the patterns 12d and 22d adjacent to the respective patterns 12a and 22a to the detection circuit 53.

Figure 6:
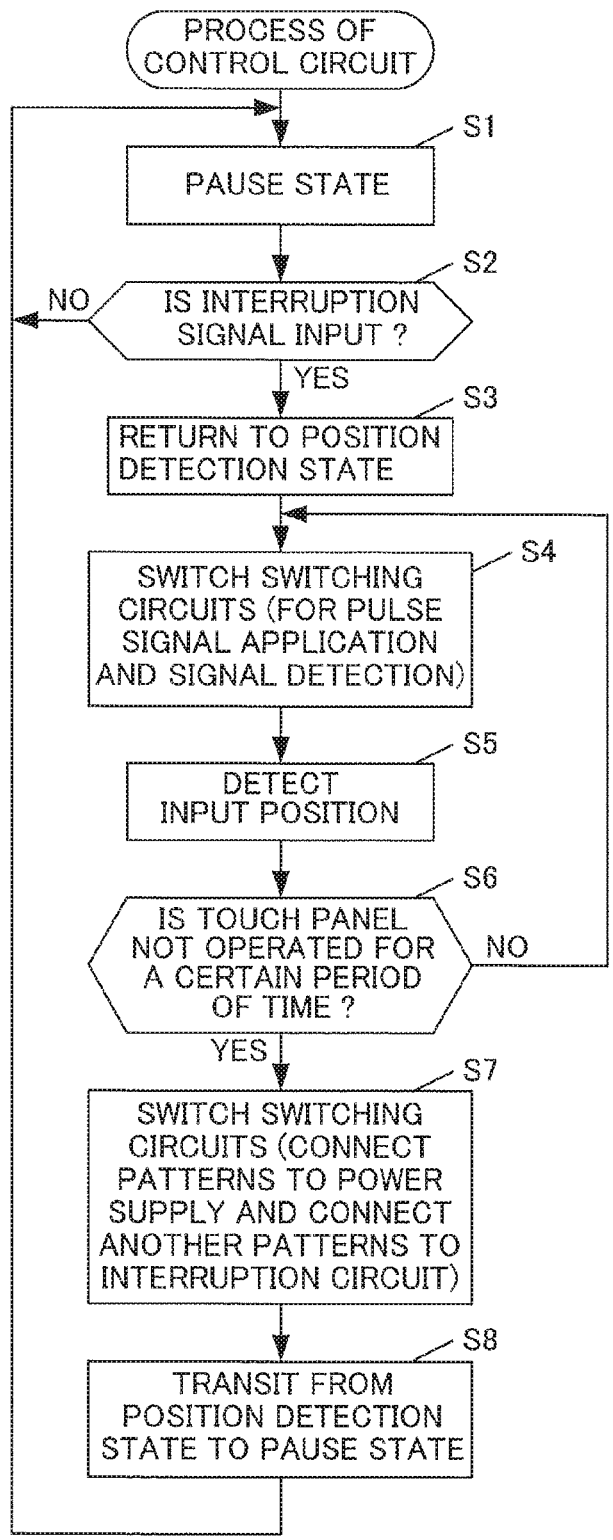
FIG. 6 is a flowchart illustrating the process of the control circuit.

FIG. 6 is a flowchart illustrating the process of the control circuit.

First, the control circuit 44 is in the pause state (step S1). All the patterns 12a to 12l are connected to the power supply 43, and the patterns 22a to 22l are connected to the interruption circuit 52. The control circuit 44 judges whether the interruption signal is input to the interruption circuit 52 (step S2). When the interruption signal is not input to the interruption circuit 52 (NO in step S2), the procedure returns to step S1.

When the interruption signal is input to the interruption circuit 52 (YES in step S2), the control circuit 44 returns to the position detection state from the pause state (step S3), and switches the switching circuits 41 and 42 so as to connect the driving circuit 51 to the patterns to which the pulse signal is applied and connect the detection circuit 53 to the patterns for detecting the signal (step S4). In step S4, the control circuit 44 performs a process for changing the patterns to which the pulse signal is applied and the patterns for detecting the signal by sequentially shifting them one by one. The change of the patterns to which the pulse signal is applied and the patterns for detecting the signal is performed at regular time intervals, for example. The control circuit 44 detects the input position based on the signal detected by the detection circuit 53 (step S5).

The control circuit 44 judges whether the touch panel 1 is not operated for a certain period of time, i.e., the detection circuit 53 does not detect a signal for a certain period of time (step S6). When it is judged that the touch panel 1 is operated (NO in step S6), the procedure returns to step S4. On the other hand, when it is judged that the touch panel 1 is not operated for a certain period of time (YES in step S6), the control circuit 44 switches the switching circuits 41 and 42 so as to connect all the patterns 12a to 12l of the first substrate 10 to the power supply 43 and connect the patterns 22a to 22l of the second substrate 20 to the interruption circuit 52 (step S7). Then, the control circuit 44 transits from the position detection state to the pause state (step S8), and the procedure returns to step S1.

Thus, in the present embodiment, the touch panel device 40 functions as a resistance film type touch panel by making the control circuit 44 into the pause state until the interrupt signal is input. Thereby, until the first conductive film contacts the second conductive film, the control circuit 44 does not perform the position detection operation, the scanning of the patterns is not needed, and hence the power consumption can be suppressed. When the interruption signal is input, the touch panel device 40 functions as an electrostatic capacitance type touch panel that detects the input position while sequentially switching the patterns to which the pulse signal is applied and the patterns for detecting the signal. Moreover, in the present embodiment, a particular member (e.g., a pressure sensor) does not need to be incorporated in the touch panel 1 to detect the depression of the touch panel 1, and hence it is possible to reduce the thickness of the touch panel.

In the present embodiment, when the input position is detected, the control circuit 44 switches the connection destinations of the switching circuits 41 and 42 so that the touch panel device 40 functions as the electrostatic capacitance type touch panel. However, the control circuit 44 may switch the connection destinations of the switching circuits 41 and 42 so as to connect one of the pattern 12 and the pattern 22 arranged opposite to each other at the same position in a horizontal plane (i.e., an X-Y plane) direction to the driving circuit 51 and connect the other of the pattern 12 and the pattern 22 to the detection circuit 53. Here, a voltage is applied to only the pattern connected to the driving circuit 51. In this state, the patterns opposite to each other function as the resistance film type touch panel, and the contact detection can be performed when the patterns contact each other. Then, the touch panel device 40 may sequentially switch the pattern to be connected to the driving circuit 51 and the opposite pattern to be connected to the detection circuit 53.

Figure 7A:
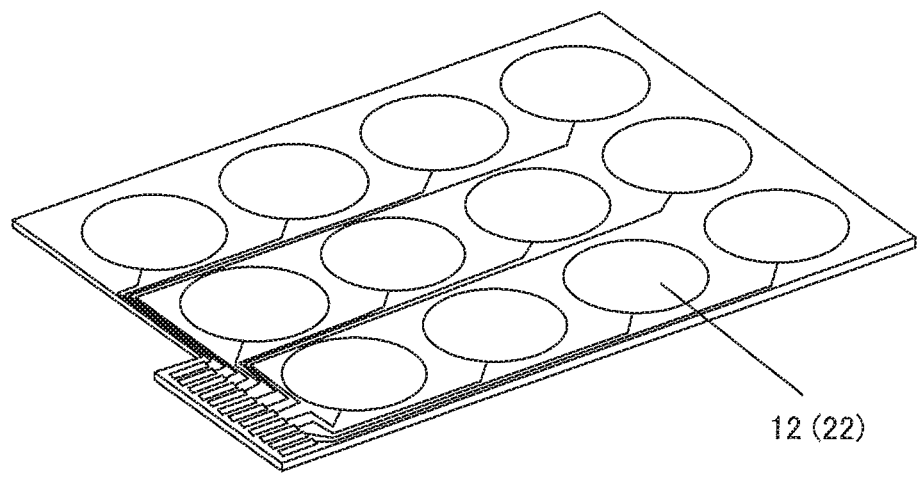
FIGS. 7A and 7B are diagrams illustrating variation examples of the shapes of separated patterns.
Figure 7B:
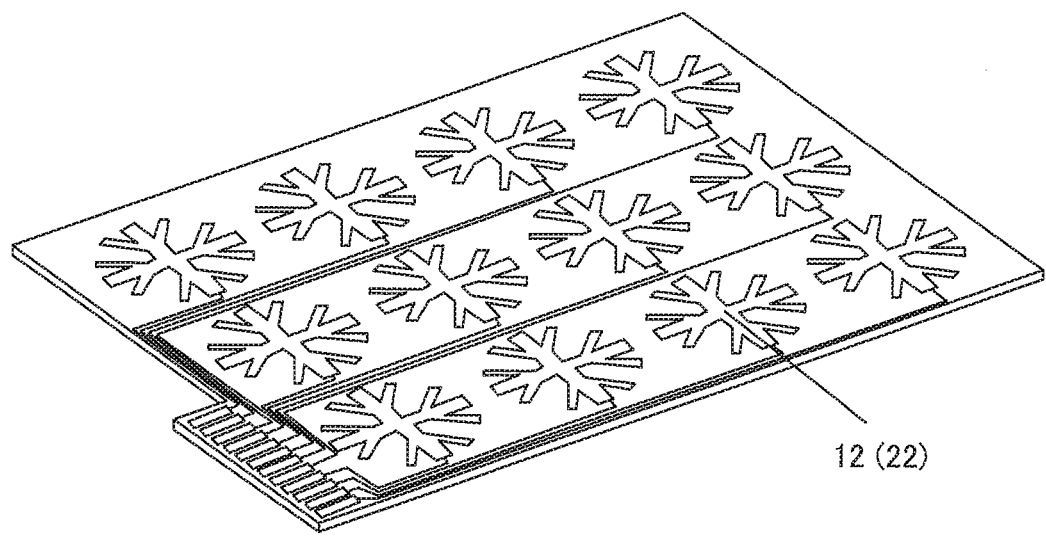

In the present embodiment, the shape of each of the separated patterns 12 and 22 is a square, but may be a rectangle or a rhombus. The shape of each of the separated patterns 12 and 22 may be a round shape, as illustrated in FIG. 7A. The shape of each of the separated patterns 12 and 22 may be a dendritic shape, as illustrated in FIG. 7B.

Figure 8:
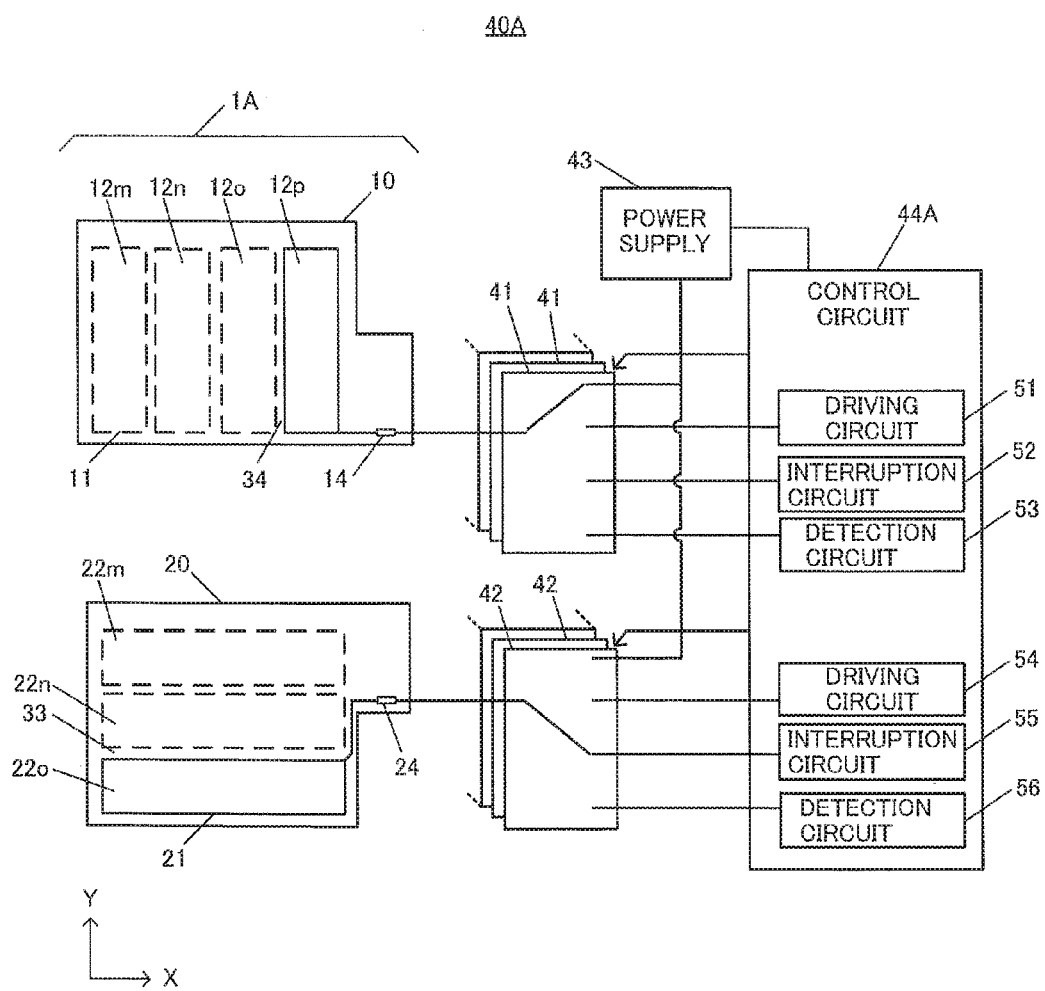
FIG. 8 is a diagram illustrating a variation example of the configuration of the touch panel device according to the present embodiment.

FIG. 8 is a diagram illustrating a variation example of the configuration of the touch panel device according to the present embodiment.

A touch panel device 40A of FIG. 8 includes a touch panel 1A, the switching circuits 41 and 42, the power supply 43, and a control circuit 44A. Component elements corresponding to those of the touch panel device 40 in FIG. 3 are designated by identical reference numerals, and description thereof is omitted.

The touch panel 1A is a so-called projected capacitive touch panel, and includes the first substrate 10 having flexibility, and the second substrate 20. The first conductive film 11 is provided on the lower surface of the first substrate 10. The second conductive film 21 is provided on the upper surface of the second substrate 20. The first conductive film 11 includes a plurality of patterns 12$m$ to 12$p$ which are electrically separated from each other, and the second conductive film 21 includes a plurality of patterns 22$m$ to 22$o$ which are electrically separated from each other. Each of the patterns 12$m$ to 12$p$ has a rectangular shape extending in a Y-direction, and each of the patterns 22$m$ to 22$o$ has a rectangular shape extending in an X-direction. That is, when the first substrate 10 is opposite to the second substrate 20, the longitudinal direction of the patterns 12$m$ to 12$p$ is located perpendicular to the longitudinal direction of the patterns 22$m$ to 22$o$.

Spacers (not shown) are arranged on positions of the second substrate 20 where areas 33 and areas 34 overlap with each other when the first substrate 10 is opposite to the second substrate 20. Each of the areas 33 on which the first conductive film 11 is not formed is arranged between the patterns 12 adjacent to each other in the X-direction. Each of the areas 34 on which the second conductive film 21 is not formed is arranged between the patterns 22 adjacent to each other in the Y-direction.

The control circuit 44A includes a driving circuit 54, an interruption circuit 55 and a detection circuit 56 in addition to the driving circuit 51, the interruption circuit 52 and the detection circuit 53.

Also in the touch panel device 40A, when a user does not perform the input operation, the control circuit 44A becomes the pause state not to consume an electric power. Each of overlapping portions of the patterns 12$m$ to 12$p$ and the patterns 22$m$ to 22$o$ constitutes a switch for detecting the contact of the patterns 12 and 22. The control circuit 44A returns to the position detection state by detecting the interruption caused by the contact of the patterns 12 and 22, and performs the position detection.

In the detection of the input position, the control circuit 44A controls the switching circuits 41 so as to connect the pattern 12$p$ to the driving circuit 51 and connect the pattern 12$o$ adjacent to the pattern 12$p$ to the detection circuit 53. When the signal detection process of the pattern 12$o$ is completed, the control circuit 44A controls the switching circuits 41 so as to connect the pattern 12$o$ to the driving circuit 51 and connect the pattern 12$n$ adjacent to the pattern 12$o$ to the detection circuit 53. Thus, the control circuit 44A sequentially shifts the pattern to which the pulse signal is applied and the pattern for detecting the signal along the X-direction one by one, and detects the input position in the X-direction.

Similarly, the control circuit 44A controls the switching circuits 42 so as to connect the pattern 22$o$ to the driving circuit 54 and connect the pattern 22$n$ adjacent to the pattern 22$o$ to the detection circuit 56. When the signal detection process of the pattern 22$o$ is completed, the control circuit 44A controls the switching circuits 42 so as to connect the pattern 22$n$ to the driving circuit 54 and connect the pattern 22$m$ adjacent to the pattern 22$n$ to the detection circuit 56. Thus, the control circuit 44A sequentially shifts the pattern to which the pulse signal is applied and the pattern for detecting the signal along the Y-direction one by one, and detects the input position in the Y-direction.

Thus, by sequentially shifting the patterns, the control circuit 44A can perform the signal detection process with the use of each of the areas where the patterns formed on the first substrate 10 overlap with the patterns formed on the second substrate 20.

The touch panel device 40A of FIG. 8 functions as the resistance film type touch panel by making the control circuit 44A into the pause state until the interruption signal is input. Thereby, until the first conductive film contacts the second conductive film, the control circuit 44A does not perform the position detection operation, and hence the power consumption can be suppressed. When the interruption signal is input by the contact of the patterns, the touch panel device 40A functions as the electrostatic capacitance type touch panel that detects the input position while sequentially switching the pattern to which the pulse signal is applied and the pattern for detecting the signal. Moreover, for example, a pressure sensor does not need to be incorporated in the touch panel 1A to detect the depression of the touch panel 1A, and hence it is possible to reduce the thickness of the touch panel.

As described above, according to the present embodiment, the touch panel device 40 includes: the first substrate 10 having the plurality of patterns 12 (12$a$ to 12$l$) which are electrically separated from each other; the second substrate 20 having the plurality of patterns 22 (22$a$ to 22$l$) which are arranged opposite to the plurality of patterns 12 and electrically separated from each other; and the control circuit 44 that is in the pause state until one of the patterns 12 contacts opposite one of the patterns 22, and begins the detection of the input position when one of the patterns 12 contacts opposite one of the patterns 22. Therefore, the power consumption can be suppressed. Since the first substrate 10 having the plurality of patterns 12 and the second substrate 20 having plurality of the patterns 22 constitute the resistance film type touch panel, the pressure sensor does not need to be incorporated in the touch panel, for example, and hence it is possible to reduce the thickness of the touch panel.

Moreover, according to the present embodiment, the touch panel device 40A includes: the first substrate 10 having the plurality of patterns 12 (12m to 12p) which are electrically separated from each other; the second substrate 20 having the plurality of patterns 22 (22m to 22o) which are arranged opposite to and perpendicular to the patterns 12, and electrically separated from each other; and the control circuit 44A that is in the pause state until one of the patterns 12 contacts opposite one of the patterns 22, and begins the detection of the input position when one of the patterns 12 contacts opposite one of the patterns 22. Therefore, the power consumption can be suppressed. Since the first substrate 10 having the plurality of patterns 12 and the second substrate 20 having plurality of the patterns 22 constitute the resistance film type touch panel, the pressure sensor does not need to be incorporated in the touch panel, and hence it is possible to reduce the thickness of the touch panel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A touch panel device comprising:
   a first substrate having a plurality of first patterns which are electrically separated from each other;
   a second substrate having a plurality of second patterns which are arranged opposite to the first patterns and which are electrically separated from each other; and
   a controller that is in a pause state until one of the first patterns contacts one of the second patterns, and begins detection of an input position when the one of the first patterns contacts the one of the second patterns,
   wherein the controller includes
   a driving circuit that applies a same driving signal to the one of the first patterns and to the one of the second patterns arranged opposite to the one of the first patterns, and
   a detector that detects signals from another first pattern adjacent to the first pattern to which the driving signal is applied and another second pattern adjacent to the second pattern to which the driving signal is applied, and
   wherein the controller detects the input position by sequentially switching the first and the second patterns to which the driving signal is applied and the another first and the another second patterns for detecting the signals for the another first and second patterns.

2. The touch panel device as claimed in claim 1, further comprising: a first switch that is connected to the first patterns, and switches each connection destination of the first patterns to any one of a power supply, the driving circuit and the detector in accordance with a control from the controller; and a second switch that is connected to the second patterns, and switches each connection destination of the second patterns to any one of the power supply, the driving circuit and the detector in accordance with a control from the controller.

3. The touch panel device as claimed in claim 2, wherein the controller includes an interrupter that detects, as an interrupt signal, the contact of the one of the first patterns and the one of the second patterns.

4. The touch panel device as claimed in claim 3, wherein until the one of the first patterns contacts the one of the second patterns, the controller controls the first and the second switches so that either of the first patterns and the second patterns are connected to the power supply and the another of the first and second patters are connected to the interrupter.

5. The touch panel device as claimed in claim 2, wherein When the one of the first patterns contacts the one of the second patterns, the controller controls the first and the second switches so that one of the first patterns and one of the second patterns are connected to the driving circuit, and the another of the first patterns and the another of the second patterns are connected to the detector.

6. A touch panel device comprising:
   a first substrate having a plurality of first patterns which are electrically separated from each other;
   a second substrate having a plurality of second patterns which are arranged opposite to the first patterns and which are electrically separated from each other; and
   a controller that is in a pause state until one of the first patterns contacts one of the second patterns, and begins detection of an input position when the one of the first patterns contacts the one of the second patterns,
   wherein the one of the first patterns has a same shape as the one of the second patterns and is located at the same position as the one of the second patterns in a top view.

* * * * *

UNITED STATES PATENT AND TRADEMARK OFFICE
CERTIFICATE OF CORRECTION

PATENT NO.       : 9,952,714 B2                                   Page 1 of 1
APPLICATION NO.  : 15/131458
DATED            : April 24, 2018
INVENTOR(S)      : Nobuo Yatsu et al.

It is certified that error appears in the above-identified patent and that said Letters Patent is hereby corrected as shown below:

In the Claims

Column 10, Line 25:
In Claim 4, delete "patters" and insert -- patterns --, therefore.

Column 28, Line 28:
In Claim 5, delete "When" and insert -- when --, therefore.

Signed and Sealed this
Third Day of July, 2018

Andrei Iancu
*Director of the United States Patent and Trademark Office*